United States Patent

[11] 3,598,933

[72] Inventor Jurg Walser
Griefensee, Switzerland
[21] Appl. No. 836,097
[22] Filed June 24, 1969
[45] Patented Aug. 10, 1971
[73] Assignee Contraves AG
Zurich, Switzerland
[32] Priority Dec. 6, 1968
[33] Switzerland
[31] 18266/68

[54] ELECTRICAL MULTIPOSITIONAL SWITCH ARRANGEMENT
15 Claims, 7 Drawing Figs.

[52] U.S. Cl. .......... 200/11, 250/219, 338/32, 335/205, 340/354
[51] Int. Cl. .......... H01h 19/58
[50] Field of Search .......... 200/11 D, 166 C, 153; 250/219; 338/32 H; 335/205, 207; 340/354

[56] References Cited

UNITED STATES PATENTS

| | | | |
|---|---|---|---|
| 2,770,796 | 11/1956 | Boer | 340/354 X |
| 3,104,388 | 9/1963 | Balenger | 340/354 |
| 3,139,600 | 6/1964 | Rasmanis et al. | 338/32 H |
| 3,162,804 | 12/1964 | Parsons | 338/32 H UX |
| 3,447,109 | 5/1969 | Shlesinger, Jr. | 335/205 |
| 3,458,840 | 7/1969 | Chapman | 335/207 |

*Primary Examiner*—Robert K. Schaefer
*Assistant Examiner*—J. R. Scott
*Attorney*—Werner W. Kleeman

ABSTRACT: An electrical multipositional switch arrangement is disclosed having a rotatable switching wheel and at least one stationary circuit board or plate possessing contact tracks for the purpose of generating switching signals in accordance with a predetermined code as a function of the position of the switching wheel. The switch arrangement includes connection elements mounted between corresponding contact tracks, these connection elements being actuated according to the predetermined code in dependency upon the position of the switching wheel by switching means which do not come in contact with the connection elements.

INVENTOR
JURG WALSER
BY Jacobi, Davidson & Kleeman
ATTORNEYS

INVENTOR
JURG WALSER
BY Jacobi, Davidson & Kleeman
ATTORNEYS

INVENTOR
JURG WALSER
BY Jacobi, Davidson & Kleeman
ATTORNEYS

ELECTRICAL MULTIPOSITIONAL SWITCH ARRANGEMENT

BACKGROUND OF THE INVENTION

The instant invention generally relates to multipositional selector switches and particularly concerns an improved electrical multipositional selector switch arrangement incorporating a rotatable switching wheel and at least one stationary circuit board or plate possessing contact tracks for the purpose of generating switching signals in accordance with a predetermined code as a function of the position of the switching wheel.

Multipositional selector switch arrangements are known in the art in which a rotary wiper switch means possessing contact fingers or the like is secured to the switching wheel. In the momentary switching position of the switching wheel, these contact fingers serve to electrically connect appropriate contact tracks of the circuit board. With these and other known multipositional switching arrangements, the switching signals occur due to the closing and opening, respectively, of galvanic contacts.

Yet, the contact resistances of galvanic contacts are subjected to certain fluctuations. It is, of course, possible to increase of the contact pressure. Yet, however, a random increase of contact pressure is not possible because the longevity of the switch is shortened due to the increased mechanical wear and cold welds might occur between the contacts. Additionally, galvanic contacts may be damaged by plasticizing vapors such as $SO_2$, $H_2S$ and so forth which occur in the atmosphere. Furthermore, dust particles and other fine contaminants can influence the switching characteristics of the switch. These difficulties become particularly important during switching of small currents of less than 1 mA with low voltages of less than 2 volts. For currents in the $\mu$A-range and voltages in the mV-range, switches of the above-described construction must be considered as totally unreliable since the switching signals generated are subjected to quite large variations.

SUMMARY OF THE INVENTION

Accordingly, it is a primary object of the present invention to provide an improved electrical multipositional switch arrangement which effectively overcomes the aforementioned drawbacks of prior art constructions.

Further object of the instant invention is the provision of an improved electrical multipositional switch arrangement in which small currents at small voltages can be switched with great reliability.

Another object of the instant invention is the provision of a multipositional switch arrangement which does not require or depend on contact resistances of galvanic contacts.

Now, in order to implement these and still further objects of the invention which will become more readily apparent as the description proceeds, the proposed inventive multipositional selector switch arrangement is manifested by the features that connection elements are mounted between appropriate contact tracks, these connection elements being actuated in dependency upon the position of the switching wheel in accordance with a predetermined code and without contact through switching means.

The closing and opening of a galvanic contact causes a primary switching signal to occur. In a simply expressed fashion, the change of electrical resistance upon closing and opening of a galvanic contact would be between $\infty$ and $O$. However, with modern day electronic circuits, much smaller changes of electrical magnitudes, particularly resistances, are sufficient for achieving such switching effect. A series of electrically active and passive components are known in which contactless switching signals can be generated. The use of such electronic components enables the construction of a multipositional switch arrangement having switching properties which are also reliable in the range of both low voltages and small currents. Such constructions of multipositional selector switch arrangements are also particularly insensitive to oxidizing and plasticizing vapors as might oftentimes be present in industrial plants. Further, such multipositional selector switch arrangements can easily be constructed to be dustproof and watertight.

A preferred embodiment of the novel multipositional selector switch arrangement contains switchable elements such as field plates, for example, as the connection elements. With such field plates, one is primarily dealing with periodic table Group III-V semiconductors, such as Ga As and so forth. Thus, it is possible to generate a resistance change with the aid of a magnetic field. In any event particular attention must be given to the magnetic screening of the multipositional arrangement. Additionally, connection elements of the type in which switching signals can be produced with radioactive radiations, preferably a $\beta$-radiation, such as semiconductor detectors, for example, would be suitable for multipositional switch arrangements. Other embodiments of multipositional switch arrangements which are suitable for alternating current can contain capacitances or inductances as the connection elements, which elements can be influenced in an appropriate manner.

Particularly advantageous for the realization of a multipositional switch arrangement are light-electrical connection elements, preferably photoelectric cells, such as, for instance, selenium cells, in which it is possible to generate a voltage or a current by means of light. Photodiodes or photoresistors such as CdS, for example, also can be used in which resistance can be changed by light. The utilization of such light-electrical connection elements is particularly suitable for a multiplicity of possible switching codes. It is also possible to mount further electronic elements in the switch, such elements comprising integrated circuits, for example, which would transform the switching signal generated by the connection element such that a standardized signal would appear at the output-contact track, such standardized signal comprising a square wave pulse, for example.

BRIEF DESCRIPTION OF THE DRAWINGS

The invention will be better understood and objects, advantages and features other than those set forth above will become readily apparent from the following detailed description of preferred embodiments, such description referring to the appended sheets of drawings depicting a plurality of embodiments of the inventive electrical multipositional switch arrangement, and components thereof and therefor, and wherein.

DESCRIPTION OF PREFERRED INVENTIVE EMBODIMENTS

Figure 1:
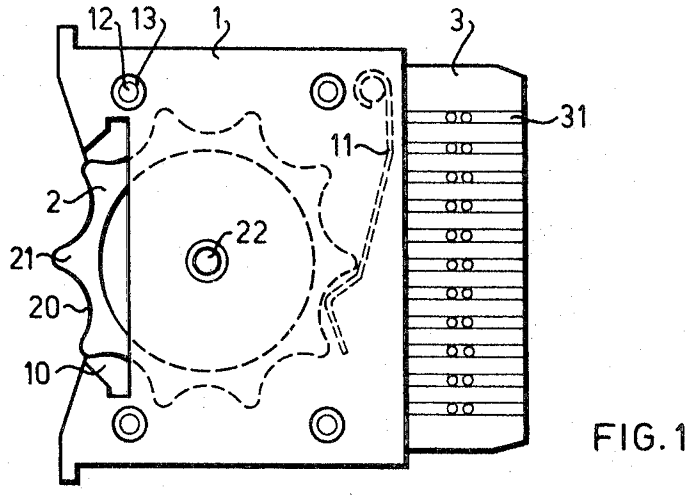
FIG. 1 schematically depicts a side view of a preferred embodiment of a multipositional selector switch arrangement.

Describing now the drawings, and making particular reference to FIG. 1 thereof, it will be seen that an exemplary embodiment of inventive multipositional selector switch comprises a housing 1, a rotatable switching wheel 2 possessing a shaft member 22, and a circuit board or plate 3 equipped with contact tracks 31. At the front side of the housing 1, a suitable opening or window 10 is provided through which, in each switching position of the switching wheel 2, one of the teeth 21 formed at the switching wheel 2, protrudes. Recesses 20 between each two neighboring teeth 21 of the switching wheel 2, serve to both receive the finger of the operator and to receive the end of a spring member 11 which engages in such recesses and thus serves to retain the switching wheel 2 in a momentary switching position. It is possible to place such switches in an "in-line" arrangement, that is to say, it is possible to place a plurality of such switches in side-by-side relationship to combine them into a single switching package or module and to facilitate such, through-passage holes 12 for connection screws or equivalent structure may be provided. The holes 12 are extended at one side by outwardly directed conical sleeve members 13 and at the other side conical recesses are provided for receiving the conical ends of sleeve members 13.

Figure 2:
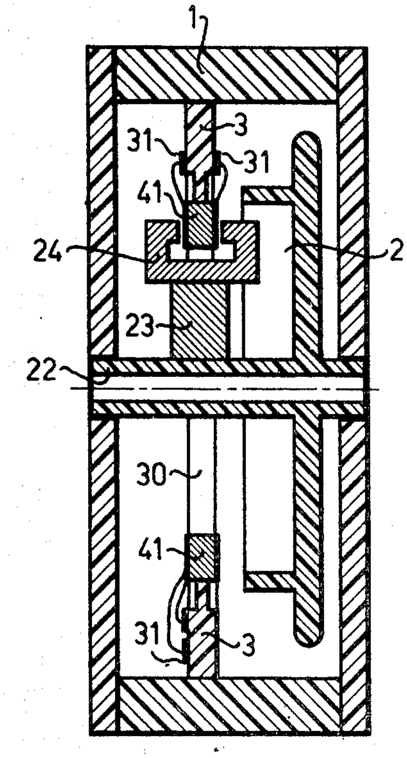
FIG. 2 schematically depicts a sectional view of a multipositional selector switch arrangement comprising magnetically switchable connection elements.

Referring now to FIG. 2, a schematic illustration, in section, of a multipositional selector switch arrangement having magnetically switchable connection elements 41 such as field plates, for example, is shown. The circuit board or plate 3 is arranged within the housing 1. Field plates 41 are disposed at the periphery of a circle, at the center of which, switching wheel shaft 22 is disposed, in a recess 30 of circuit board 3 and serves to connect, for example, two respective contact tracks 31 which can be situated at different sides of the circuit board 3. A permanent magnet 24 is mounted or provided at the cam means 23 which extends perpendicular to the axis of the shaft 22 of switching wheel 2. The poles of permanent magnet 24 during rotations of the switching wheel move along a circle, the radius of which is equal to that upon which are arranged the field plates 41. In each switching position, a field plate 41 is disposed between the poles of magnet 24.

Similarly, capacitance elements suitable for alternating current could be utilized as the connection elements. In the same manner as shown in FIG. 2, capacitance plates would take the place of field plates 41 disposed at the periphery of the circle and alternating current would be provided for such capacitance plates. Now, instead of permanent magnet 24 provided at cam means 23, a body formed of material having a dielectric constant which is greater than 1 would be provided. During rotation of the switching wheel in this embodiment, the dielectric material would move along a circle, the radius of which is equal to that upon which would be arranged the capacitance plates, and in each switching position of the switch, the dielectric material would be disposed between the plates of the individual capacitances, to thus alter their signals.

Figure 3:
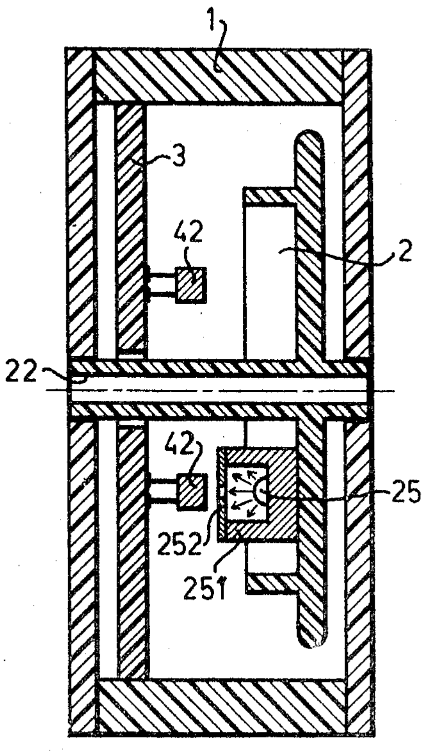
FIG. 3 schematically depicts a sectional view of a multipositional selector switch arrangement possessing radioactive switchable connection elements.

FIG. 3 schematically illustrates, in section, a view of the multipositional selector switch arrangement having connection elements 42 such as semiconductor detectors, for example, for the contact tracks, these connection elements being capable of being switched by radioactive radiation such as $\beta$-radiation. The circuit board 3 is disposed within the housing 1. Connection elements 42 which, as described above, can be switched by radioactive radiation, are disposed in a circular format about the rotational axis or shaft 22 of the switching wheel 2. A radioactive radiation source 25 fixedly connected with the rotatable switching wheel 2 is situated in each switching position above the connection element 42 and therefore causes the switching of connection elements 42. So as to limit the scope of the radioactive rays, the radioactive source may be enclosed or shielded, for example, in a container 251 having a diaphragm or stop member 252.

Figure 4:
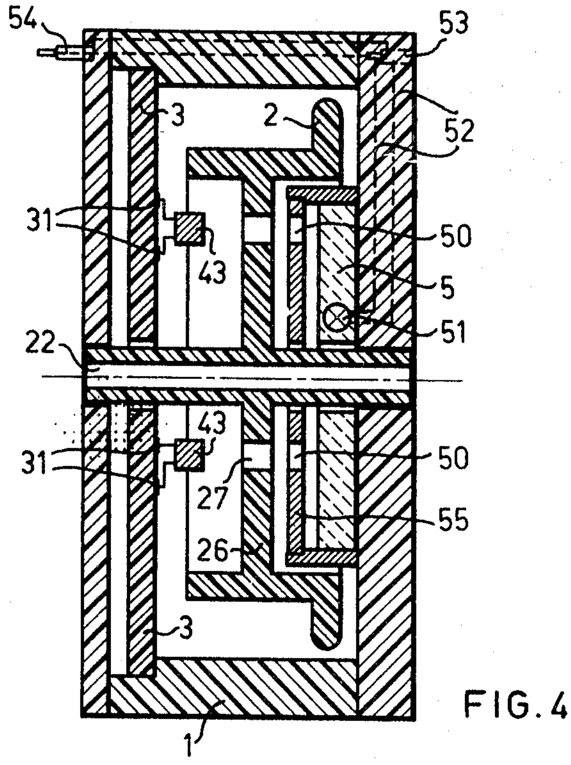
FIG. 4 schematically depicts a sectional view of a multipositional selector switch arrangement having optically switchable connection elements.

FIG. 4 schematically illustrates a sectional view of an optical-electrical multipositional selector switch arrangement. Connection elements 43, for example, preferably comprises photoresistors or photoelectric cells and can be switched without contact by light. These connection elements 43 are mounted between appropriate contact tracks of the circuit board 3. A stationary luminous body 5 serves as the switching means in which light, for example, is generated by a lamp 51. The luminous body 5 could also appropriately be designed as a gas-discharge tube or a semiconductor-light source which would produce light of a predetermined wavelength. The current supplied occurs via conductors 52 which pass through the housing wall. Further, the housing can be provided with socket or plug connectors 53 and plugs 54, which, when assembling a plurality of similar switches into a single switching package or module, ensure for the delivery of energy to the lamps 51 of each individual multipositional selector switch arrangement.

Furthermore, it will be recognized that a stationary apertured diaphragm or stop member 55 is provided in front of the luminous body or surface 5. The apertured diaphragm 55 is provided with apertures or holes 50 disposed in such a fashion that a light source is produced over each connection element 43. The plate 26 of the rotatable switching wheel 2 is provided with apertures or holes 27 in such a manner that in each position of the switching wheel, in accordance with a predetermined code, light impinges upon corresponding connection elements 43 and appropriate switching signals can be produced. According to still another embodiment of the multipositional selector switch arrangement of the instant invention, it would be possible to install or mount the necessary light sources directly in the plate 26 of the switching wheel.

Figure 5:
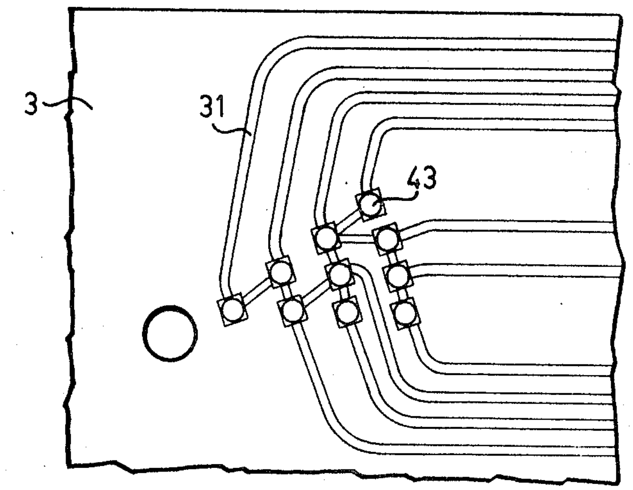
FIG. 5 depicts a fragmentary view of a circuit board possessing contact tracks and further depicts a possible arrangement of optically switchable connection elements.

FIG. 5 illustrates, in a plan view, a portion of the circuit board or plate 3 having contact tracks 31. The connection elements 43 which may comprise photoresistors, for example, and which are switched by means of light, are disposed in a sector of a circle.

Figure 6:
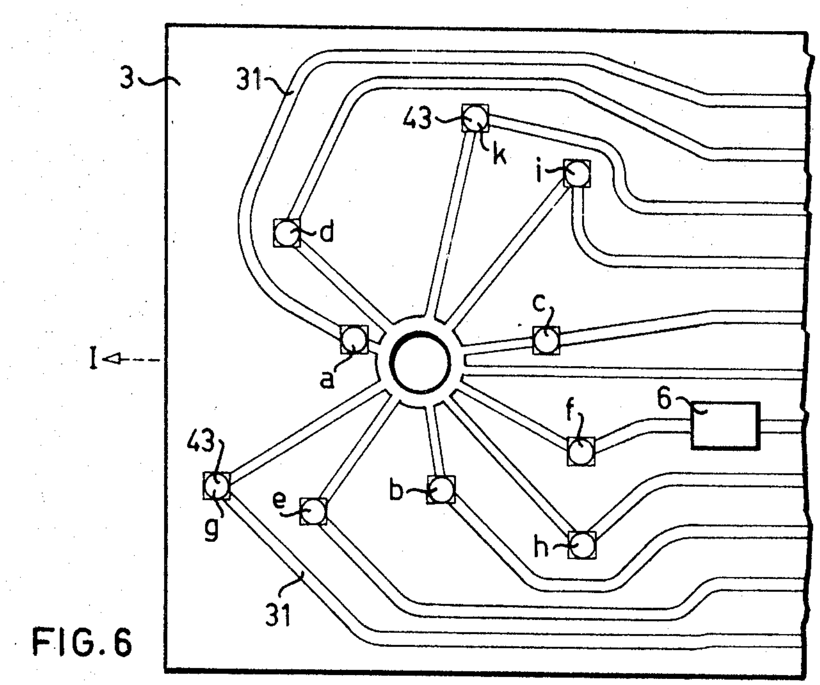
FIG. 6 depicts a fragmentary view of a further circuit board possessing a different arrangement of optically switchable connection elements.

In FIG. 6, each of the connection elements 43 designated by characters *a* through *k* which may comprise respective photoelements, for example, are mounted in different circular sectors. In the circular sectors which are congruent with respect to one another, the position of each connection element 43 is different from that of the remaining connection elements in their circular sectors, such that, for each position of switching wheel 2, diaphragm apertures 27 must be present for the different connection elements 43 in accordance with the code, thus rendering possible a large number of switching combinations. The switching signal produced in the connection element 43, specifically designated with reference character *f*, for example, is delivered via the corresponding contact track 31 to a suitable converter or transducer 6, such as an integrated circuit, for example. Consequently, at the output of contact track 31, a standardized output signal would appear such as an amplified electrical signal corresponding to the switching signal.

Figure 7:
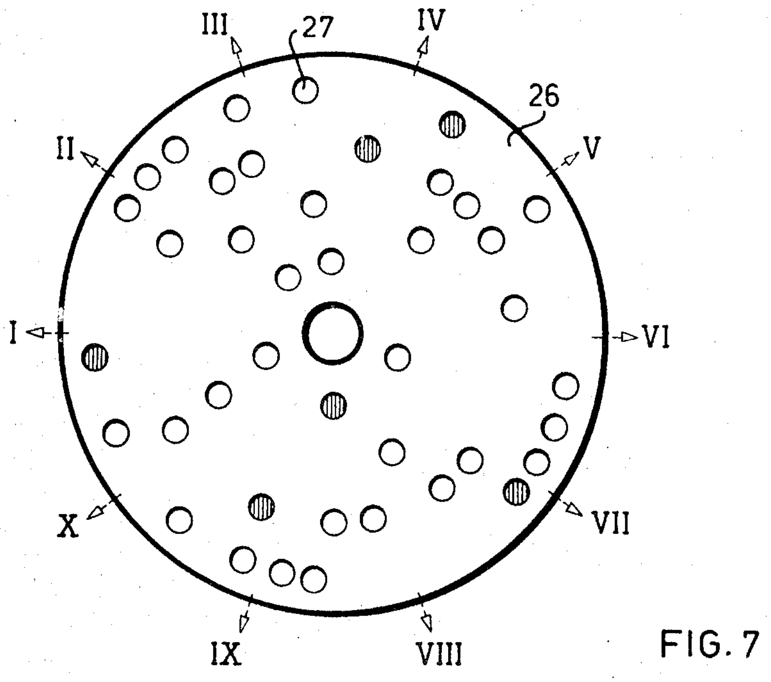
FIG. 7 schematically illustrates a rotatable apertured disc with diaphragm apertures corresponding to a predetermined code for the arrangement of connection elements depicted in FIG. 6.

FIG. 7 depicts an exemplary embodiment of plate member 26 constructed as a rotatable apertured shutter or diaphragm of the switching wheel provided with diaphragm holes or apertures 27. This example is applicable for the arrangement of connection elements 43 as depicted in FIG. 6. At the periphery of plate member 26, the switching positions are designated by the use of Roman numerals and arrows.

The switching code is as follows:

| SWITCH POSITION | CONNECTION ELEMENT TO BE ILLUMINATED |
|---|---|
| I | None |
| II | a |
| III | a.b.c.g.i |
| IV | d.e.h.k |
| V | b.i |
| VI | a.b,c.d.e.f.g.h.i.k |
| VII | d.f.h |
| VII | a.d.f.g.h.k |
| IX | d.e.f.k |
| X | a.c.d.e.f.g.h.k |

The diaphragm apertures or holes 27 present in the switching position VIII according to the above optionally selected code have been particularly emphasized in the drawing of FIG. 7 by the use of hatching.

It should be readily apparent from the foregoing detailed description that the objects set forth at the outset of the specification have now been successfully achieved.

What I claim is:

1. An electrical multipositional selector switch arrangement comprising housing means, a rotatable switching wheel mounted in said housing means for rotation about a predetermined axis into a plurality of possible respective switching positions, a stationary circuit board equipped with current conducting-contact tracks mounted at least at one side and adjacent said rotatable switching wheel for generating switching signals as a function of the position of said switching wheel, electrical connection elements disposed between neighboring connection terminals of sections of said current conducting-contact tracks at predetermined locations of said stationary circuit board, switching means provided for said rotatable switching wheel, said switching means being selectively movable via said rotatable switching wheel to said predetermined locations of said stationary circuit board for actuating without mechanical contact said electrical connection elements to switch the electrical operation thereof from a respective rest condition into a respective operating condition considerably different from said rest condition.

2. An electrical multipositional selector switch arrangement as defined in claim 1, wherein said connection elements disposed between said contact tracks comprises photoresistors and wherein said switching means comprises at least one light source.

3. An electrical multipositional selector switch arrangement as defined in claim 1, wherein said connection elements between said contact tracks comprise photoelectric cells and wherein said switching means comprises at least one light source.

4. An electrical multipositional selector switch arrangement as defined in claim 2, wherein said at least one light source is stationary and wherein at least one apertured diaphragm having at least one diaphragm hole is provided to determine the effect of said light source upon said connection elements.

5. An electrical multipositional selector switch arrangement as defined in claim 3, wherein said at least one light source is stationary and wherein at least one apertured diaphragm having at least one diaphragm hole is provided to determine the effect of said light source upon said connection elements.

6. An electrical multipositional selector switch arrangement as defined in claim 4, wherein said light source comprises a luminous body.

7. An electrical multipositional selector switch arrangement as defined in claim 5, wherein said light source comprises a luminous body.

8. An electrical multipositional selector switch arrangement as defined in claim 4, wherein portions of said switching wheel are constructed as an apertured diaphragm.

9. An electrical multipositional selector switch arrangement as defined in claim 5, wherein portions of said switching wheel are constructed as an apertured diaphragm.

10. An electrical multipositional selector switch arrangement as defined in claim 2, wherein said light source is disposed at said rotatable switching wheel.

11. An electrical multipositional selector switch arrangement as defined in claim 3, wherein said light source is disposed at said rotatable switching wheel.

12. An electrical multipositional selector switch arrangement as defined in claim 1, wherein said connection elements disposed between said contact tracks comprise magnetically controllable semiconductor elements and wherein said switching means comprises at least one magnet.

13. An electrical multipositional selector switch arrangement as defined in claim 1, wherein said connection elements disposed between said contact tracks comprise semiconductor elements switchable by radioactive radiation, and wherein said switching means comprises at least one source of radioactive radiation.

14. An electrical multipositional selector switch arrangement as defined in claim 1, wherein said connection elements disposed between said contact tracks comprise capacitances and wherein said switching means comprises at least one body constructed of a material having a dielectric constant which is greater than 1.

15. An electrical multipositional selector switch arrangement as defined in claim 1, wherein converter means are provided to transform the switching signals produced in said connection elements.